(12) United States Patent
St-Laurent et al.

(10) Patent No.: US 10,661,346 B2
(45) Date of Patent: May 26, 2020

(54) LOW MELTING POINT METAL OR ALLOY POWDERS ATOMIZATION MANUFACTURING PROCESSES

(71) Applicant: 5N PLUS INC., Montréal (CA)

(72) Inventors: Sylvain St-Laurent, Repentigny (CA); Shizhu Chen, Ottawa (CA); Hui Li, Kanata (CA)

(73) Assignee: 5N PLUS INC., Montréal (CA)

(*) Notice: Subject to any disclaimer, the term of this patent is extended or adjusted under 35 U.S.C. 154(b) by 0 days.

(21) Appl. No.: 16/327,127

(22) PCT Filed: May 5, 2017

(86) PCT No.: PCT/CA2017/050553
§ 371 (c)(1),
(2) Date: Feb. 21, 2019

(87) PCT Pub. No.: WO2018/035599
PCT Pub. Date: Mar. 1, 2018

(65) Prior Publication Data
US 2019/0193164 A1    Jun. 27, 2019

Related U.S. Application Data

(60) Provisional application No. 62/378,734, filed on Aug. 24, 2016.

(51) Int. Cl.
*B22F 9/08* (2006.01)
*B01J 2/06* (2006.01)
(Continued)

(52) U.S. Cl.
CPC ............... *B22F 9/082* (2013.01); *B01J 2/06* (2013.01); *B22F 1/0011* (2013.01);
(Continued)

(58) Field of Classification Search
None
See application file for complete search history.

(56) References Cited

U.S. PATENT DOCUMENTS 3,834,629 A * 9/1974 Hellman ............... B22D 41/50
239/594
3,849,120 A   11/1974 Norman
(Continued)

FOREIGN PATENT DOCUMENTS

CA      1017151      9/1977
CA      1294131      1/1992
(Continued)

OTHER PUBLICATIONS

Agrawal et al., "Solid Waste management in non-ferrous industries in India", Resources, Conservation and Recycling, vol. 42, Issue 2, Sep. 2004, pp. 99-120, Abstract only.
(Continued)

*Primary Examiner* — George Wyszomierski
(74) *Attorney, Agent, or Firm* — Bereskin & Parr LLP/S.E.N.C.R.L., s.r.l.

(57) ABSTRACT

Atomization processes for manufacturing a metal powder or an alloy powder having a melting point comprising of about 50° Celsius to about 500° Celsius are provided herein. In at least one embodiment, the processes comprise providing a melt of a metal or an alloy having said melting point of about 50° Celsius to about 500° Celsius through a feed tube; diverting the melt at a diverting angle with respect to a central axis of the feed tube to obtain a diverted melt; directing the diverted melt to an atomization area; and providing at least one atomization gas stream to the atomization area. The atomization process can be carried out in the presence of water within an atomization chamber used for the atomization process. In at least one embodiment, the processes provide a distribution of powder with an average (Continued)

particle diameter under 20 microns with geometric standard deviation of lower than about 2.0.

22 Claims, 10 Drawing Sheets

(51) Int. Cl.
    *B22F 1/00*             (2006.01)
    *B33Y 80/00*           (2015.01)

(52) U.S. Cl.
    CPC .... *B22F 1/0048* (2013.01); *B22F 2009/0884* (2013.01); *B22F 2009/0892* (2013.01); *B22F 2304/10* (2013.01); *B22F 2999/00* (2013.01); *B33Y 80/00* (2014.12)

(56) References Cited

U.S. PATENT DOCUMENTS

| | | | |
|---|---|---|---|
| 3,988,084 | A | 10/1976 | Esposito et al. |
| 4,006,010 | A | 2/1977 | Rajcevic et al. |
| 4,144,055 | A | 3/1979 | Petersson et al. |
| 4,162,915 | A | 7/1979 | Maes et al. |
| 4,169,725 | A | 10/1979 | Makipirtti |
| 4,272,463 | A * | 6/1981 | Clark ............ B22F 9/082 75/337 |
| 4,382,903 | A | 5/1983 | Larsson et al. |
| 4,614,541 | A | 9/1986 | Berndt et al. |
| 4,758,268 | A | 7/1988 | Bishop et al. |
| 4,787,935 | A * | 11/1988 | Eylon ............ B22F 9/08 425/7 |
| 4,831,943 | A | 5/1989 | Aune |
| 5,071,067 | A | 12/1991 | Larsson |
| 5,282,881 | A | 2/1994 | Baldock et al. |
| 5,496,392 | A | 3/1996 | Sims et al. |
| 5,529,292 | A | 6/1996 | Accary et al. |
| 5,554,207 | A | 9/1996 | Bogdan et al. |
| 5,656,061 | A | 8/1997 | Miller et al. |
| 5,738,705 | A | 4/1998 | Anderson et al. |
| 5,855,642 | A | 1/1999 | Miller et al. |
| 5,891,212 | A | 4/1999 | Tang et al. |
| 5,906,671 | A | 5/1999 | Weinwurm et al. |
| 5,917,113 | A | 6/1999 | Suzuki |
| 5,993,509 | A | 11/1999 | Tsao et al. |
| 6,083,454 | A | 7/2000 | Tang et al. |
| 6,142,382 | A | 11/2000 | Ting et al. |
| 6,146,439 | A | 11/2000 | Larsson et al. |
| 6,162,377 | A | 12/2000 | Ghosh et al. |
| 6,245,123 | B1 | 6/2001 | Edlinger |
| 6,254,661 | B1 | 7/2001 | Takeda et al. |
| 6,284,015 | B1 | 9/2001 | Ankudinov et al. |
| 6,290,745 | B1 | 9/2001 | Schulze et al. |
| 6,312,498 | B1 | 11/2001 | Lee et al. |
| 6,334,884 | B1 | 1/2002 | Tornberg |
| 6,336,953 | B1 | 1/2002 | Kikukawa et al. |
| 6,398,125 | B1 | 6/2002 | Liu et al. |
| 6,446,878 | B1 | 9/2002 | Chandra et al. |
| 6,461,403 | B1 | 10/2002 | Olsen |
| 6,481,638 | B1 | 11/2002 | Schulz |
| 6,485,674 | B2 | 11/2002 | Schulze et al. |
| 6,491,737 | B2 | 12/2002 | Orme-Marmerelis et al. |
| 6,517,602 | B2 | 2/2003 | Sato et al. |
| 6,540,129 | B2 | 4/2003 | Lee |
| 6,554,166 | B2 | 4/2003 | Sato et al. |
| 6,556,061 | B1 | 4/2003 | Chen et al. |
| 6,562,099 | B2 | 5/2003 | Orme-Marmerelis et al. |
| 6,565,342 | B1 | 5/2003 | Chow |
| 6,569,378 | B2 | 5/2003 | Lee et al. |
| 6,579,479 | B1 | 6/2003 | Edie et al. |
| 6,613,124 | B2 | 9/2003 | Chow |
| 6,632,394 | B2 | 10/2003 | Tornberg |
| 6,635,101 | B2 | 10/2003 | Minogue |
| 6,676,726 | B1 | 1/2004 | Endo et al. |
| 6,676,890 | B2 | 1/2004 | Chaleat et al. |
| 6,773,246 | B2 | 8/2004 | Tsao et al. |
| 6,923,842 | B2 | 8/2005 | Furuya |
| 6,926,860 | B2 | 8/2005 | Endo et al. |
| 7,029,624 | B2 | 4/2006 | Orme-Marmerelis et al. |
| 7,093,463 | B1 | 8/2006 | Wolf et al. |
| 7,097,687 | B2 | 8/2006 | Chow |
| 7,137,572 | B2 | 11/2006 | Wang |
| 7,182,279 | B2 | 2/2007 | Wang |
| 7,246,758 | B2 | 7/2007 | Wang |
| 7,291,200 | B2 | 11/2007 | Shimizu et al. |
| 7,297,178 | B2 | 11/2007 | Kempf et al. |
| 7,309,375 | B2 | 12/2007 | Tornberg |
| 7,422,619 | B2 | 9/2008 | Chow |
| 7,431,750 | B2 | 10/2008 | Liao et al. |
| 7,485,254 | B2 | 2/2009 | Nakabayashi et al. |
| 7,503,958 | B2 | 3/2009 | Matsubara et al. |
| 7,553,443 | B2 | 6/2009 | Nakabayashi et al. |
| 7,578,961 | B2 | 8/2009 | Shimura |
| 7,588,622 | B2 | 9/2009 | Chow |
| 7,628,838 | B2 | 12/2009 | Walter et al. |
| 7,780,757 | B2 | 8/2010 | Furuya |
| 7,846,380 | B2 | 12/2010 | Shimura |
| 7,913,884 | B2 | 3/2011 | Kennedy |
| 7,988,759 | B2 | 8/2011 | Shimura |
| 8,012,408 | B2 | 9/2011 | Watanabe |
| 8,118,904 | B2 | 2/2012 | Watanabe |
| 8,608,823 | B2 | 12/2013 | Koenig et al. |
| 9,725,784 | B2 | 8/2017 | McHugh et al. |
| 2002/0125591 | A1 | 9/2002 | Jaynes et al. |
| 2002/0134198 | A1 | 9/2002 | Edlinger |
| 2008/0271568 | A1 | 11/2008 | Dunkley |
| 2011/0142975 | A1 | 6/2011 | Kennedy |
| 2012/0195786 | A1 | 8/2012 | Eibisch et al. |
| 2017/0144227 | A1 * | 5/2017 | Nakaseko ............ C22C 45/02 |
| 2018/0251873 | A1 | 9/2018 | Coursol et al. |

FOREIGN PATENT DOCUMENTS

| | | |
|---|---|---|
| CA | 2075794 | 2/1994 |
| CA | 2170206 | 8/1997 |
| CA | 2251752 | 10/1997 |
| CA | 2251751 | 11/1997 |
| CA | 2336070 | 1/2000 |
| CA | 2262263 | 8/2000 |
| CA | 2384120 | 1/2002 |
| CA | 2463125 | 4/2003 |
| CA | 2516992 | 9/2004 |
| CA | 2753577 | 9/2010 |
| CN | 1566379 | 1/2005 |
| CN | 103114206 | 5/2013 |
| CN | 103215463 | 7/2013 |
| CN | 104004918 | 8/2014 |
| EP | 1063038 | 12/2000 |
| GB | 2154902 | 9/1985 |
| RU | 2441081 | 1/2012 |
| WO | WO-2019/157594 A1 * | 8/2019 |

OTHER PUBLICATIONS

Atsushi el al, "Treatment of smelting residue for arsenic removal and recovery of copper using pyro-hydrometallurgical process", Journal of Hazardous Materials, vol. 181, Issues 1-3, Sep. 15, 2010, pp. 1016-1023, Abstract only.

English Abstract of CN101787434(A), "Method for recovering iron and tin-lead-zinc from magnetic separation waste residue by rotary kiln through deoxygenation, chloridization and oxidation", published on Jul. 28, 2010.

English Abstract of DE4030554(A1), "Procedure and device for thermal treatment of waste materials—comprises reactor combustion zone charged with waste, coke and lime, and gas produced passes through hot coke be also located in reactor", published on Apr. 9, 1992.

English Abstract of JP2009209405(A), "Method for smelting copper-containing dross", published on Sep. 17, 2009.

English Translation—Machine Translation of CN1566379, "Copper-zinc separation method during smelting in a blast furnace", published on Jan. 19, 2005.

(56) References Cited

OTHER PUBLICATIONS

English Translation—Machine Translation of CN103114206A, "Method and device for recovering valuable elements from lead-silver-bismuth slag in copper smelting", published on May 22, 2013.
English Translation—Machine Translation of CN104004918(A), "Method for collocation of kiln slag with copper blast furnace", published on Aug. 27, 2014.
English Translation—Machine Translation of RU2441081, "Method of pyrometallurgical processing of copper-containing materials", published on Jan. 27, 2012.
John Perry Walker, "Scheme for the treatment of copper smelter flue dust", Materials Science and Engineering, Missouri School of Mines and Metallurgy, 1911. (The year of publication is sufficiently earlier than the effective U.S. filing date so that the particular month of publication is not an issue).
Montenegro et al., "Recirculation of high arsenic content copper smelting dust to smelting and converting processes", Minerals Engineering, vol. 49, Aug. 2013, pp. 184-189, Abstract only.
M. Shamsuddin, "Metal Recovery from Scrap and Waste", JOM, Feb. 1986, vol. 38, Issue 2, pp. 24.
English Translation—Machine Translation of CN103215463(A), "Method for decomposing bastnaesite through calcification transformation-leaching", published on Jul. 24, 2013.

\* cited by examiner

LOW MELTING POINT METAL OR ALLOY POWDERS ATOMIZATION MANUFACTURING PROCESSES

CROSS-REFERENCE TO RELATED APPLICATIONS

The present application is a 35 USC 371 national stage entry of PCT/CA2017/050553 filed on May 5, 2017 and which claims the benefit of priority from U.S. provisional application No. 62/378,734 filed on Aug. 24, 2016. These documents are hereby incorporated by reference in their entirety.

FIELD OF THE DISCLOSURE

The field of the disclosure pertains to the production of fine metallic powders for application in the electronic industry, metal injection forming, thermal spraying, thermal spray welding, 3D printing.

BACKGROUND OF THE DISCLOSURE

During the last decades, electronic devices and components have been significantly reduced in size. This has a direct impact on the dimensions of internal components and metallization of such devices. Solder paste is widely used for point contacts between the different components or layers inside electronic devices. These paste are composed of metallic powders and of fluxes, to ensure proper melting and adhesion to other components. The metallic components in the soldering paste is generally in the form of a "low melting point alloy" or "low melting point metal" and the size distribution of such metallic powder depends on size of the point contact. Smaller electronic devices and components requiring smaller contacts, hence a growing demand is seen for solder paste with metallic powders having smaller size distribution. It is not uncommon to have required or requested particle size distribution mostly under 20 and even under 10 microns.

There are multiple other applications for fine metallic powders, such as metal injection forming, thermal spraying, thermal spray welding, 3D printing and many more.

Conventional techniques (atomization, centrifugal disintegration, water atomization . . . ) can produce fine powders, but the particle size standard deviation and the spherical shape of the particles are difficult to achieve from low melting point alloys. This often leads to a low recovery of the produced powder in a defined size fraction from these technologies.

SUMMARY OF THE DISCLOSURE

The present disclosure describes a new production process for metallic powders having low melting points. This process produces fine spherical powders with a small standard deviation on the particle diameter.

In a first aspect, there is provided a low melting point metal or alloy powder atomization manufacturing process. In at least one embodiment, the process may include: providing a melt of said low melting point metal or alloy through a feed tube; diverting said melt at a diverting angle with respect to a central axis of the feed tube to obtain a diverted melt; directing the diverted melt to an atomization area; and providing at least one atomization gas stream to the atomization area.

The atomization process may be being carried out in the presence of water within an atomization chamber used for said atomization process.

In a second aspect, there is provided a low melting point metal or alloy powder atomization manufacturing process. The process may include
providing a melt of said low melting point metal or alloy through a feed tube; delivering said melt through a diverter to an atomization area; providing at least one atomization gas stream to the atomization area; and
delivering water to an atomization chamber used for said atomization process. In such process, prior to being delivered to the atomization area, the melt may be diverted in the diverter at a diverting angle with respect to a central axis of the feed tube.

In a third aspect, there is provided a low melting point metal or alloy powder atomization manufacturing process. The process may include
providing a melt of said low melting point metal or alloy through a feed tube; directing the melt to an atomization area; and
providing at least one atomization gas stream having an average gas velocity of at least 300 m/s, to the atomization area, wherein a ratio of the atomization gas to the low melting point metal in the atomization area is about 5 000 to about 30 000 cm$^3$ of gas per cm$^3$ of metal to atomize, thereby providing a distribution of powder with an average particle diameter under 20 microns with geometric standard deviation of lower than about 2.0.

In a fourth aspect, there is provided a low melting point metal or alloy powder atomization manufacturing process. The process may include
providing a melt of said low melting point metal or alloy through a feed tube;
optionally diverting said melt at a diverting angle with respect to a central axis of the feed tube to obtain an optionally diverted melt;
directing the optionally diverted melt to an atomization area; and providing at least one atomization gas stream having a velocity of at least 300 m/s, to the atomization area, wherein a ratio of the atomization gas to the low melting point metal in the atomization area is about 5 000 to about 30 000-cm3 of gas per cm3 of metal to atomize, thereby providing a distribution of powder particle sizes having geometric standard deviation of lower than about 2.0.

BRIEF DESCRIPTION OF DRAWINGS

For a better understanding of the various embodiments described herein, and to show more clearly how these various embodiments may be carried into effect, reference will be made, by way of example, to the accompanying drawings which show at least one example embodiment, and in which.

DESCRIPTION OF VARIOUS EMBODIMENTS

Figure 1:
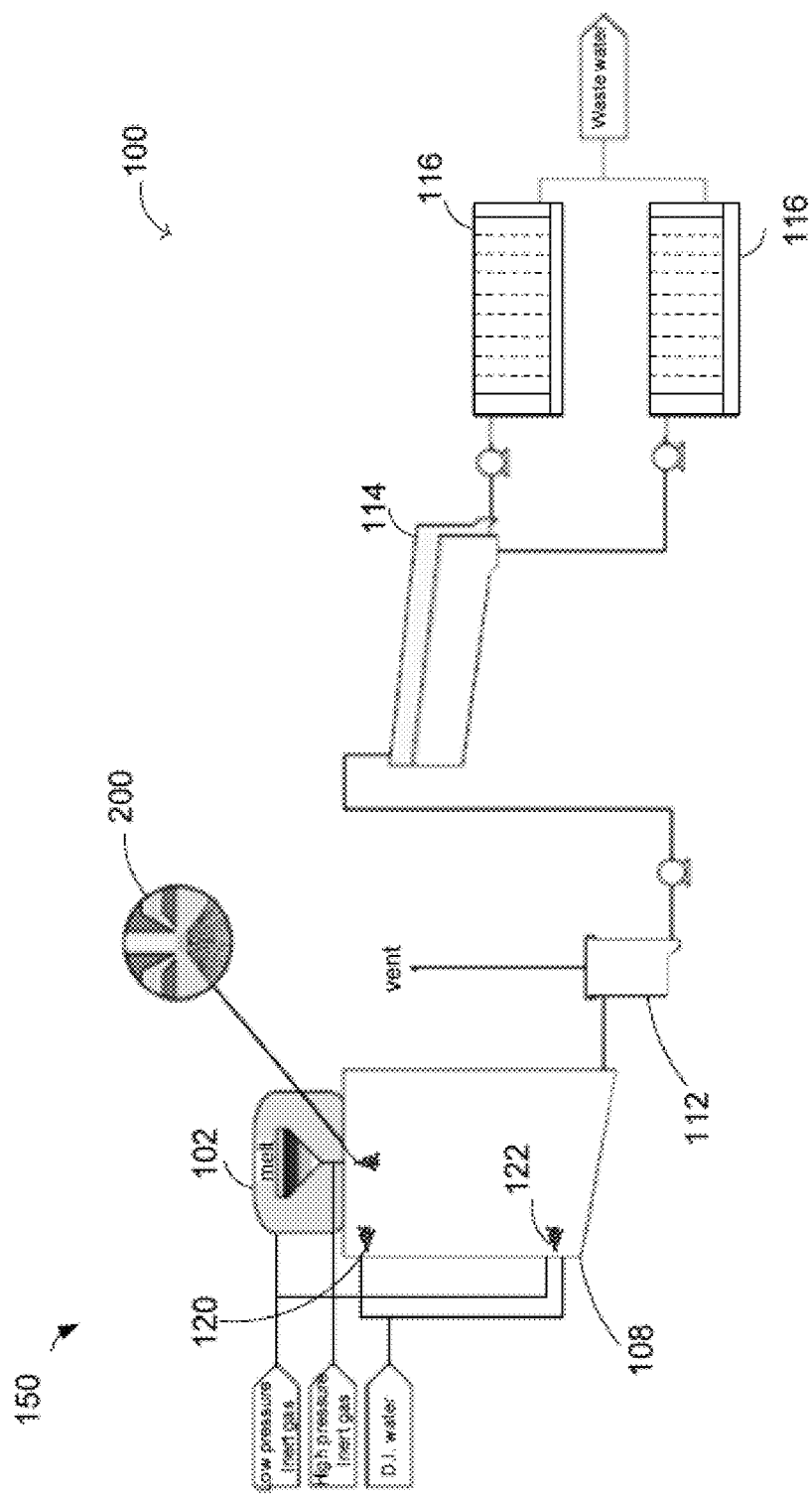
FIG. 1 is a block diagram illustrating steps involved in the atomization process, in accordance with at least one embodiment.

The following examples are provided in a non-limitative manner.

The expression "low melting point metal" as used herein refers to a metal having a melting point temperature of about 50° Celsius to about 500° Celsius.

The expression "low melting point alloy" as used herein refers to an alloy having a liquidus temperature of about 50° Celsius to about 500° Celsius.

In the production of fine metallic powders, there are several parameters that can affect product quality. Some of the parameters used to characterize powders may include average size distribution, standard deviation of the size distribution, proportion of coarser particles and finer particles over/under predefined sizes, sphericity of the powder, level of metallic impurities and oxygen level.

In at least one embodiment, the diverting angle (90−Beta) may be about 30 to about 70 degrees.

In at least one embodiment, the diverting angle may be about 10 to about 90 degrees.

In at least one embodiment, an angle formed between the atomization gas and the melt may be about 10 to about 90 degrees.

In at least one embodiment, an angle formed between the atomization gas and the melt may be about 40 to about 90 degrees.

In at least one embodiment, the process may comprise providing a low melting point metal.

In at least one embodiment, the low melting point metal may have a melting point of about 150° Celsius to about 500° Celsius.

In at least one embodiment, a ratio of the atomization gas to the low melting point metal in the atomization area may be about 10 000 to about 20 000 cm$^3$ of gas per cm$^3$ of metal to atomize.

In at least one embodiment, a ratio of the atomization gas to the low melting point metal in the atomization area may be about 5 000 to about 30 000 cm$^3$ of gas per cm$^3$ of metal to atomize.

In at least one embodiment, the low melting point metal may be an element chosen from Zn, In, Sn, Pb, Se, Te, and Bi.

In at least one embodiment, the process may include providing a low melting point alloy.

In at least one embodiment, the low melting point alloy may have a liquidus of about 75° Celsius to about 500° Celsius.

In at least one embodiment, the low melting point alloy may have a liquidus of about 100° Celsius to about 300° Celsius.

In at least one embodiment, a ratio of atomization gas to the low melting point alloy may be about 10 000 to about 20 000 cm$^3$ of gas per cm$^3$ of metal.

In at least one embodiment, a ratio of atomization gas to the low melting point alloy may be about 5000 to about 30 000 cm$^3$ of gas per cm$^3$ of metal.

In at least one embodiment, the low meting alloy may include at least one element chosen from Cu, Sb, Zn, In, Mg, Sn, Pb, Ag, Se, Te, Ga, and Bi.

In at least one embodiment, the atomization gas stream may have a velocity of about 300 m/s to about 700 m/s.

In at least one embodiment, the atomization gas stream may have a velocity of about 450 m/s to about 600 m/s.

In at least one embodiment, the atomization gas stream may have a supersonic speed.

In at least one embodiment, the atomization gas may be delivered to an atomization head through at least one gas inlet oriented in a non-perpendicular way with respect to the atomization head, the gas inlet providing a swirl movement in the atomization head prior to the gas exit.

In at least one embodiment, at least two gas injectors may be offset versus the central axis of the feed tube, creating a dynamic rotational effect around the central axis in the atomization area.

In at least one embodiment, the process may thereby provide a distribution of powder particle sizes with geometric standard deviation of lower than or about 1.8.

In at least one embodiment, the process may thereby provide a distribution of powder particle sizes with geometric standard deviation of about 1.5 to about 1.8.

In at least one embodiment, the atomization chamber may comprise about 0 to about 20% of oxygen.

In at least one embodiment, the water may comprise at least one additive to reduce the redox potential of the water.

In at least one embodiment, the redox potential of the water has been reduced prior to the atomization.

In at least one embodiment, the temperature of the water used in the atomization chamber is lowered so as to reduce the powders oxidation in the atomization process In at least one embodiment, the process may thereby provide powder average particles size of about 3 microns to about 20 microns in diameter.

In at least one embodiment, the melt of said low melting point metal may be diverted through at least one melt diverting channel and the diverting angle may be formed between the central axis of the feed tube and the at least one melt diverting channel.

In at least one embodiment, the alloy melt may be diverted through at least two melt diverting channels and the diverting angle may be formed between the central axis of the feed tube and the at least two melt diverting channels.

In at least one embodiment, at least one jet of water may be sprayed into the atomization chamber.

In at least one embodiment, the at least one jet of water may be sprayed on at least one wall of the atomization chamber.

In at least one embodiment, the process may thereby provide a powder having an average particle size of less than about 20 microns.

In at least one embodiment, the process may thereby provide a powder having an average particle size of less than about 10 microns.

In at least one embodiment, the produced powder may be vacuum dried to avoid powders oxidation.

In at least one embodiment, the produced powder may be washed with an organic solvent to remove most of the water prior of the drying stage.

In a fifth aspect, an atomization device for manufacturing low melting point metal or alloy powder is provided. The device may include a feed tube for providing a melt of said low melting point metal or alloy; a diverter, in fluid flow communication with said feed tube, for diverting the melt at a diverting angle with respect to a central axis of the feed tube to obtain a diverted melt, and to directing the diverted melt to an atomization area of the atomization device; at least one atomization gas injector for providing at least one atomization gas stream to the atomization area located inside the atomization chamber; and at least one water inlet for providing water within an atomization chamber of said atomization device.

In at least one embodiment, the diverter may comprise a melt diverting conduit, the diverting conduit being oriented at a diverting angle with respect to a central axis of the feed tube.

In at least one embodiment, the diverter may comprise at least two melt diverting conduits, each of the at least two melt diverting conduits being oriented at a diverting angle with respect to a central axis of the feed tube.

In at least one embodiment, the device may comprise at least one gas inlet, the at least one gas inlet being non perpendicular to the atomization head as to provide a swirl movement in the atomization head and a dynamic rotational movement in the atomization area and the atomization chamber.

In at least one embodiment, at least one non perpendicular gas inlets may create a circular flow in the atomization head leading to a dynamic rotational movement of the gas in the atomization area and the atomization chamber.

In at least one embodiment, at least two gas inlets may be non perpendicular to the atomization head creating a swirling effect in the atomization head and a dynamic rotational effect in the atomization area and the atomization chamber.

In at least one embodiment, the at least one water inlet may be located inside the atomization chamber.

In at least one embodiment, the at least one water inlet may be suitable for providing water for cooling said powder.

In at least one embodiment, the at least one water inlet may be suitable for providing water for transporting said powder to the sieving/drying area.

In at least one embodiment, the at least one water inlet may be suitable for providing water for facilitating sorting/sieving of said powder.

The described process is based on a known concept, atomization, but with several specific improvements. These improvements include changes to the atomization head operating parameters, to the atomization chamber configuration and to the means of post processing of the powder (collection, sieving and drying) prior of packing the final product. The process is designed to reach advanced product quality and high process performances.

FIG. 1 shows a block diagram 100 of apparatus and steps involved in the atomization process, in accordance with at least one embodiment. FIG. 1 shows a melting furnace 102, the atomization nozzle 200, the atomization chamber 108, a powder collection system 112 and a sieving system 114.

Most low melting point alloys and/or low melting point metals produced with this process are sensitive to oxidation, hence the atomization gas may advantageously be an inert gas. The system may be generally maintained in near inert conditions with oxygen levels much under 21% in the atomization chamber 108. In order to save operating costs, this gas may be purified/recycled in the process.

In at least one embodiment, the atomization manufacturing process may be carried out by the atomization nozzle 200 where the atomization gas meets with a metal flow in specific conditions described herein. FIG. 1 also shows a schematic side view of the atomization nozzle 200, where the molten metal may contact the atomization gas in the atomization zone.

Once the metal has been solidified in fine powders, it is sieved and packed.

Referring to FIG. 1, some water may be added in the atomization chamber 108 through the side nozzles 120 and 122 to help collecting the powder and to bring the liquid mixture of the powder and water to the sieving area 114. These water addition side nozzles 120 and 122 may be oriented towards the atomization chamber walls or may be located in the atomization area to help cooling of the powder and to avoid adhesion/deformation of the particles on the atomization chamber walls. Water can also be added to ease powders collection and sieving. The produced powders may then be sieved and dried. After collection of the bulk of the powder, from the liquid stream, the bulk of the powder passes into filter presses 116 to recover all remaining powders in suspension prior to water recycling/disposal.

The size distribution of the powder produced during the optimization manufacturing process can be affected by the speed at which the atomization gas hits the metal. In this regards, higher velocity of the atomization gas leads to lower size distributions of the powder. If the atomization nozzle 200 is not designed properly, a smaller portion of the metal will be meeting the atomization gas in the required conditions (atomization gas velocity and volume) and larger variations in size and shape of the produced powder may be observed. The intimate contact between the low melting point metal/alloy and the atomization gas is also important.

Figure 2:
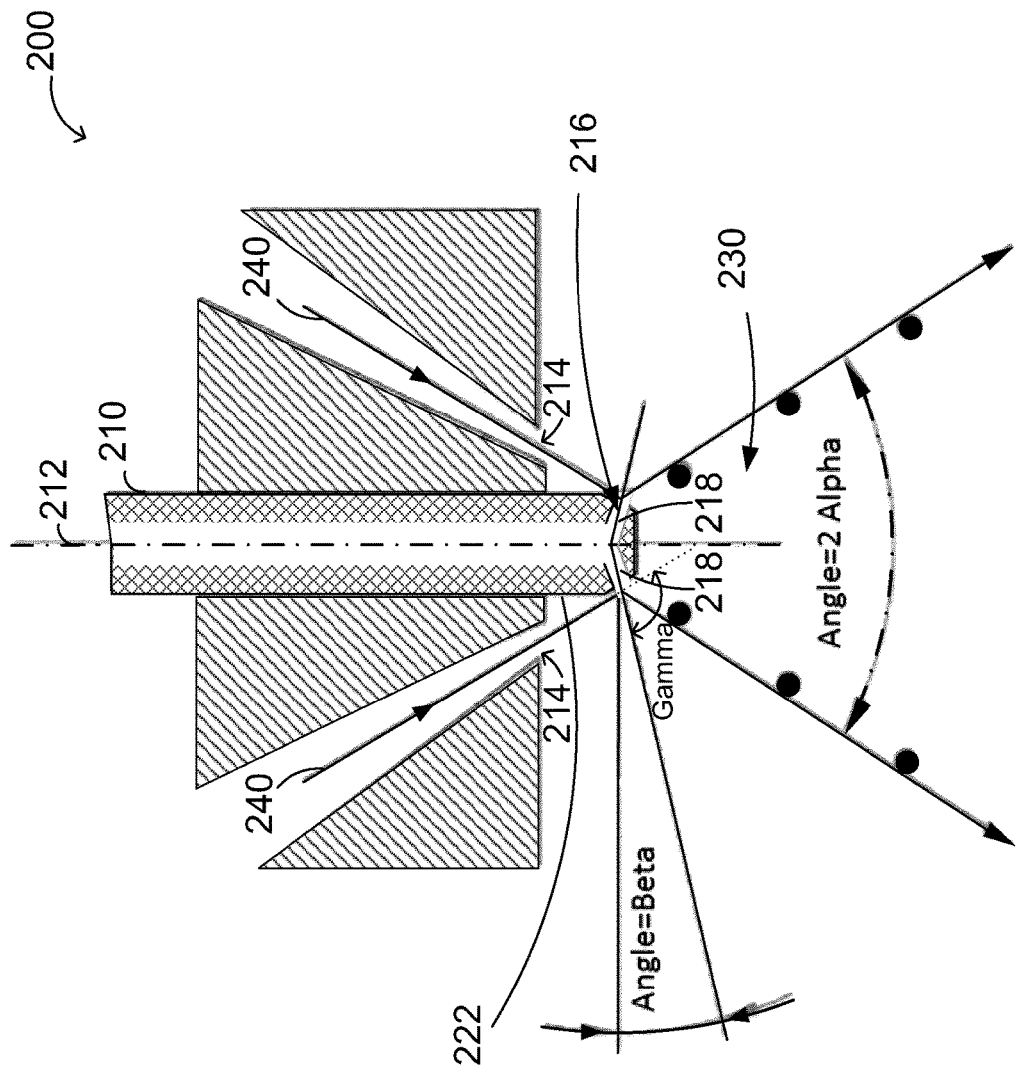
FIG. 2 illustrates a schematic side view of an atomization nozzle with a feed tube with a diverting channel to provide the melt in the atomization area, in accordance with at least one embodiment.

FIG. 2 illustrates a schematic side view of an atomization nozzle 200. The atomization nozzle 200 has a feed tube 210 with a diverting channel 216 to provide the melt in the atomization area 230.

As shown at FIG. 2, the atomization nozzle described herein comprises a feed tube 210 located between the melting furnace 102 and the atomization area 230 which is equipped with a diverter 216 (also called herein as a diverting channel 216). The role of this diverter 216 is to provide a better contact between the metal and the gas in the atomization zone 230.

The metal being hit by the atomization gas stream at a sheer angle Gamma defined as Gamma=90−Beta+Alpha. This approach provides additional parameters for improvement of the atomization process: Beta angle, as well as diameter and number of diverter channels 216.

In at least one embodiment, the metal may be diverted in the atomization area 230 with the Beta angle being about 20 to about 60 degrees. For example, the atomization gas may be provided to the atomization area 230 at an Alpha angle of about 20 to about 35 degrees.

For example, if the sheer angle Gamma is about 90 degrees, or at least about 60 to about 120°, the atomization may be improved, by an enhanced gas to metal contact and higher sheer energy The melt diverting angle is also defined herein as 90−Beta.

The Alpha angle, at which the atomization gas may be provided with respect to the feed tube 210, may also have other limitations. For example, if angle Alpha is more than 60 degrees, a close to direct projection of the atomization gas on the atomization chamber walls may require larger atomization chamber diameters.

For example, Alpha angle may be as low as about 20 to about 45°.

For example, Alpha angle may be less than about 20 to about 45°.

In at least one embodiment, the Alpha angle may be between about 0 to about 90°; about 10 to about 50; about 15 to about 50; about 20 to about 50.

In at least one embodiment, the Alpha angle may be about 20 to about 45° where 2 Alpha may be about 40° to about 90°). In at least one embodiment, the Alpha angle may be about 20 to about 40; about 30 to about 45.

Once the metal/alloy is hit by the atomization gas, small particles are formed. Collisions between those particles may produce satellites (many particles connected together) and may also produce of non-spherical metallic particles, both of which need to be avoided and/or reduced or prevented. This may be partially done by modifying Alpha and Beta angles, as well as the average atomization gas velocity and the dispersion factor.

In order to avoid collision prior to solidification, the density of particles in the atomization gas need to be controlled in an appropriate range. For example, if one cubic centimeter (cc) of metal is atomized in 10 microns diameter spherical particles in 1 $M^3$ of atomization gas, the density of particles in the plume is 1.9 Millions/$M^3$. The use of 5 $M^3$ of gas per cubic centimeter of metal would reduce this density by a factor 5. So an optimal range of gas volume per metal volume is critical to avoid collisions and also to provide the sheer energy to pulverize the metal in small dropplets and also providing proper heat exchange mechanism to solidify the dropplets rapidly. The use of 5000 to 30000 $cm^3$ of atomization gas per cubic centimeter of metal/alloy was found appropriate for the production of fine powders (under 20 microns) of low melting point metals/alloys.

Described herein are the velocity and the dispersion as being critical factors influencing the atomization results (fineness and avoidance of satellites and non atomized metal/alloys).

In at least one embodiment, the atomization device 150 may include at least one non-perpendicular atomization gas injector 214 (e.g. inlets) with respect to the gas feed tube axis 212, leading to a rotational movement of the atomization gas stream 240 in the atomization head 222. In an extreme example embodiment described below, the gas injectors 214 enter in the atomization head tangentially.

Figure 3:
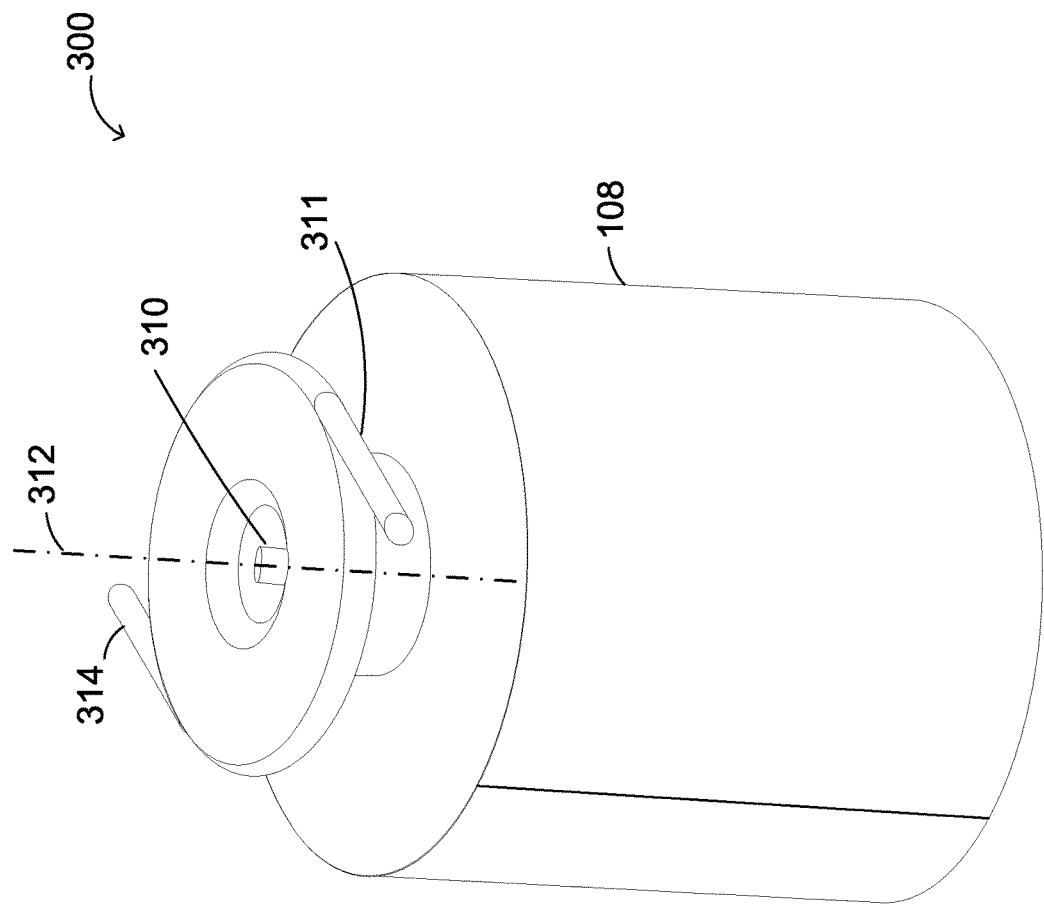
FIG. 3 illustrates a perspective view of the atomization chamber showing tangential gas entries on the gas inlet, in accordance with at least one embodiment.

FIG. 3 illustrates a perspective view of the atomization chamber 300 showing tangential gas inlets 311 and 314, in accordance with at least one embodiment. This design may allow for an asymmetric atomization plume in dynamic rotation around a central axis 312. This configuration of the atomization gas inlets may provide an improved particle size distribution compared to an atomizer with perpendicular gas entries with respect to the feed tube central axis 312.

Typically, many low melting point metals/alloys are difficult to solidify. This may be due to the poorer heat transfer at low temperature by convection, compared to the atomization of high temperature alloy/metals where radiation and higher convective cooling can play an important role. If some particles touch the walls of the atomization chamber 108 and are still partially molten or close to their melting points, they can be significantly deformed to reach a flake-type morphology, agglomerate and form non spherical particles or satellites (several particles connected together). In order to reduce these phenomena, the described atomization technology can use water as a cooling media. The water may be injected in direction of the atomization chamber walls to provide a film of water carrying the produced powder. The film of water may ensure that metallic powders or metal droplets are cooled at a sufficient temperature to reduce or avoid the sticking particles, satellites and/or deformed particles. The water, in some cases, may provide a controlled level of surface oxidation, which may also contribute to have a free flowing powder with an acceptable level of oxygen in the final product.

For example, adding water in the atomization chamber (on walls, in the upper part of the atomization chamber or at the bottom of the atomization chamber) may also improve material classification. Due to electrostatic forces being enhanced between fine particles, it is sometimes hard to separate particles if dry sieving is used. Some low melting point alloys/metals powders tend to agglomerate together for many reasons. For example, sintering or sticking of the particles and also for electrostatic reasons as mentioned above. While the exact reason for agglomeration is not fully known for all low melting point/alloys produced, there is a benefit for a wet sieving system for several alloys.

The use of water in this process may be counterintuitive, as some alloying elements/metals may theoretically oxidize in presence of water. Some elements, such as Tin, for example, may even reduce water in absence of dissolved oxygen in water. For example, when a low oxygen level is maintained in the atomization chamber, the oxidation of the produced powder may be inside acceptable levels. In addition of controlling the oxygen in the atmosphere of the atomization chamber, the redox potential and the temperature of the water used in the process (for the atomization chamber and for the sieving) may be controlled, leading to a reduced kinetic of oxidation.

Some metallic powders, made of low melting point metals/alloy, may need a controlled oxidation to remain free flowing in the final product. For example, if pure tin is produced in fine powders with very low level of oxygen (100 ppm or less), the product may stick together after sieving and drying. The presence of water at reasonably low temperature and at a controlled redox potential in the process tends to provide this level of oxidation. Optionally, oxygen peroxide or other hydrometallurgical oxidants may be added to allow a controlled level of oxidation. Alternatively, the powder may be left in water at a controlled temperature for a given period of time (with or without steering) to allow for a controlled oxidation of the powder.

While a controlled oxidation is beneficial for some products, overly high levels may be generally detrimental. Optionally, the redox of the incoming water may be lowered to limit oxidation. This can be done by adding additives in the water used in the atomization process (in the chamber or in the sieving system) to reduce the level of oxygen in the final product. Additives can be reducing agents, like organic additives, such as ethanol, methanol, formic acid, acetic acid, methane sulfonic or inorganic reductants. Redox potential in water may also be reduced by diverse other means, including but not limited to electrochemicals system to treat incoming water, reduction of temperature, filter with reactive metal powders.

In at least one embodiment, the dissolve oxygen in the incoming water may be controlled to limit oxidation in the product. In at least one embodiment, the metal film on the powder may be reduced by dissolution with mild acid (HCl, organic acids, etc.). These may be added in the water to reduce the oxide film formed at the powder surface.

One of the final production steps of the process is to dry the powder. This step can be performed atmospherically, under vacuum or in an inert gas. Vacuum allows the drying process to operate at a lower temperature, hence reducing potential oxidation with the water. Optionally, prior of the drying stage, water can be displaced from the powder using an organic solvent in which water is soluble. For example ethanol and methanol. After the water has been removed, the powder containing some residual organic liquid can be dried to produce a final product with low level of oxygen.

In at least one embodiment, a low melting point metal or alloy powder atomization manufacturing process may include providing a melt of said low melting point metal or alloy through a feed tube; diverting said melt at a diverting angle with respect to a central axis of the feed tube to obtain a diverted melt; directing the diverted melt to an atomization area; and providing at least one atomization gas stream to the atomization area. Said atomization process being carried out in the presence of water within an atomization chamber used for said atomization process.

In at least one embodiment, the low melting point metal or alloy powder atomization manufacturing process may include providing a melt of said low melting point metal or alloy through a feed tube; delivering said melt through a diverter to an atomization area; providing at least one atomization gas stream to the atomization area; delivering water to an atomization chamber used for said atomization process, wherein, prior to being delivered to the atomization area, the melt is diverted in the diverter at a diverting angle with respect to a central axis of the feed tube.

In at least one embodiment, the low melting point metal or alloy powder atomization manufacturing process may include providing a melt of said low melting point metal or alloy through a feed tube; directing the melt to an atomization area; and providing at least one atomization gas stream having an average gas velocity of at least 300 m/s, to the atomization area, wherein a ratio of the atomization gas to the low melting point metal in the atomization area is about 5 000 to about 30 000 cm$^3$ of gas per cm$^3$ of metal to atomize, thereby providing a distribution of powder with an average particle diameter under 20 microns with geometric standard deviation of lower than about 1.8. In at least one embodiment, the low melting point metal or alloy powder atomization manufacturing process may include providing a melt of said low melting point metal or alloy through a feed tube; directing the melt to an atomization area; and providing at least one atomization gas stream having an average gas velocity of at least 300 m/s, to the atomization area, wherein a ratio of the atomization gas to the low melting point metal in the atomization area is about 5 000 to about 30 000 cm$^3$ of gas per cm$^3$ of metal to atomize, thereby providing a distribution of powder with an average particle diameter under 20 microns with geometric standard deviation of lower than about 2.0.

In at least one embodiment, the low melting point metal or alloy powder atomization manufacturing process may include providing a melt of said low melting point metal or alloy through a feed tube; directing the melt to an atomization area; and providing at least one atomization gas stream having an average gas velocity of at least 300 m/s, to the atomization area, wherein a ratio of the atomization gas to the low melting point metal in the atomization area is about 5 000 to about 30 000 cm$^3$ of gas per cm$^3$ of metal to atomize, thereby providing a distribution of powder with an average particle diameter under 20 microns with geometric standard deviation of lower than about 1.8. In at least one embodiment, the low melting point metal or alloy powder atomization manufacturing process may include providing a melt of said low melting point metal or alloy through a feed tube; directing the melt to an atomization area; and providing at least one atomization gas stream having an average gas velocity of at least 300 m/s, to the atomization area, wherein a ratio of the atomization gas to the low melting point metal in the atomization area is about 5 000 to about 30 000 cm$^3$ of gas per cm$^3$ of metal to atomize, thereby providing a distribution of powder with an average particle diameter under 20 microns with geometric standard deviation of lower than about 2.0.

A low melting point metal or alloy powder atomization manufacturing process may include providing a melt of said low melting point metal or alloy through a feed tube; optionally diverting said melt at a diverting angle with respect to a central axis of the feed tube to obtain an optionally diverted melt; directing the optionally diverted melt to an atomization area; and providing at least one atomization gas stream having a velocity of at least 300 m/s, to the atomization area, wherein a ratio of the atomization gas to the low melting point metal in the atomization area is about 5 000 to about 30 000-cm$^3$ of gas per cm$^3$ of metal to atomize, thereby providing a distribution of powder particle sizes having geometric standard deviation of lower than about 1.8. A low melting point metal or alloy powder atomization manufacturing process may include providing a melt of said low melting point metal or alloy through a feed tube; optionally diverting said melt at a diverting angle with respect to a central axis of the feed tube to obtain an optionally diverted melt; directing the optionally diverted melt to an atomization area; and providing at least one atomization gas stream having a velocity of at least 300 m/s, to the atomization area, wherein a ratio of the atomization gas to the low melting point metal in the atomization area is about 5 000 to about 30 000-cm$^3$ of gas per cm$^3$ of metal to atomize, thereby providing a distribution of powder particle sizes having geometric standard deviation of lower than about 2.0.

For example, the diverting angle (90–Beta) may be about 30 to about 70 degrees.

For example, the diverting angle may be about 10 to about 90 degrees.

For example, an angle formed between the atomization gas and the melt may be about 10 to about 90 degrees. For example, an angle formed between the atomization gas and the melt may be about 40 to about 90 degrees.

In at least one embodiment, the process may also include providing a low melting point metal.

In at least one embodiment, the low melting point metal may have a melting point of about 150° Celsius to about 500° Celsius.

In at least one embodiment, a ratio of the atomization gas to the low melting point metal in the atomization area may be about 10 000 to about 20 000 cm$^3$ of gas per cm$^3$ of metal to atomize. In at least one embodiment, the ratio of the atomization gas to the low melting point metal in the atomization area may be about 5 000 to about 30 000 cm$^3$ of gas per cm$^3$ of metal to atomize.

In at least one embodiment, the low melting point metal may be an element chosen from Zn, In, Sn, Pb, Se, Te, and Bi.

In at least one embodiment, the process may comprise providing a low melting point alloy.

In at least one embodiment, the low melting point alloy may have a liquidus between about 75° Celsius to about 500° Celsius.

In at least one embodiment, the low melting point alloy may have a liquidus of about 100° Celsius to about 300° Celsius.

In at least one embodiment, a ratio of atomization gas to the low melting point alloy may be about 10 000 to about 20 000 cm$^3$ of gas per cm$^3$ of metal.

In at least one embodiment, a ratio of atomization gas to the low melting point alloy may be about 5000 to about 30 000 cm$^3$ of gas per cm$^3$ of metal.

In at least one embodiment, the low meting alloy may comprise at least one element chosen from Cu, Sb, Zn, In, Mg, Sn, Pb, Ag, Se, Te, Ga, and Bi.

In at least one embodiment, the atomization gas stream may have a velocity of about 300 m/s to about 700 m/s. In at least one embodiment, the atomization gas stream may have a velocity of about 450 m/s to about 600 m/s. In at least one embodiment, the atomization gas stream may have a supersonic speed.

In at least one embodiment, the atomization gas may be delivered to an atomization head through at least one gas inlet 314, 311 oriented in a non-perpendicular way with respect to the metal feed tube axis 312, providing a swirl movement of the atomization gas stream 240 in the atomization head 222 prior to the gas exit.

In at least one embodiment, at least two gas inlets 311, 314 may be tangential versus the central axis 312 of the feed tube 310. This configuration may create a dynamic rotational effect around the central axis 312 of the atomization plume in the atomization chamber 108.

In at least one embodiment, a distribution of powder particle sizes with geometric standard deviation may be lower than or about 2.0. In at least one embodiment, a distribution of powder particle sizes with geometric standard deviation may be of about 1.5 to about 2.0.

In at least one embodiment, a distribution of powder particle sizes with geometric standard deviation may be lower than or about 1.8. In at least one embodiment, a distribution of powder particle sizes with geometric standard deviation may be of about 1.5 to about 1.8.

In at least one embodiment, the atomization chamber 108 may comprise about 0 to about 20% of oxygen.

In at least one embodiment, the water may comprise at least one additive to control the redox potential of the water. Examples of additives comprise but are not limited to ethanol, methanol, acetic acid, HCl, $H_2O_2$.

In at least one embodiment, powder average particles size may be of about 3 microns to about 20 microns in diameter.

In at least one embodiment, the melt of the low melting point metal may be diverted through at least one melt diverting channel and the diverting angle is formed between the central axis of the feed tube and the at least one melt diverting channel.

In at least one embodiment, the alloy melt may be diverted through at least two melt diverting channels (diverters) 216 and the diverting angle (90°–Beta) may be formed between the central axis 212 of the feed tube 210 and the at least two melt diverting channels 216.

In at least one embodiment, at least one jet of water is sprayed into the atomization chamber 108.

In at least one embodiment, the at least one jet of water is sprayed on at least one wall of the atomization chamber 108.

In at least one embodiment, a powder may have an average particle size of less than about 20 microns. In at least one embodiment, a powder may have an average particle size of less than about 10 microns.

In at least one embodiment, the produced powder may be dried in vacuum to avoid powders oxidation.

In at least one embodiment, the produced powder may be washed with an organic solvent to remove most of the water prior of the drying stage. For example, the organic solvent may be ethanol or methanol.

In at least one embodiment, the atomization device 150 for manufacturing low melting point metal or alloy powder includes a feed tube 210 for providing a melt of said low melting point metal or alloy; a diverter 216, in fluid flow communication with said feed tube 210, for diverting the melt at a diverting angle with respect to a central axis of the feed tube 210 to obtain a diverted melt, and to directing the diverted melt to an atomization area 230 of the atomization device 150; at least one atomization gas injector 214 for providing at least one atomization gas stream 240 to the atomization area located inside the atomization chamber 108; and at least one water inlet 122 for providing water within an atomization chamber 108 of said atomization device 150.

In at least one embodiment, the diverter 216 may have a melt diverting conduit 218, the diverting conduit 218 being oriented at a diverting angle with respect to a central axis 212 of the feed tube 210.

In at least one embodiment, the diverter 216 may have at least two melt diverting conduits 218, each of the at least two melt diverting conduits 218 being oriented at a diverting angle with respect to a central axis 212 of the feed tube 210.

In at least one embodiment, the atomization device 150 may have at least one gas injector 214 (or inlets 311, 314). The at least one gas inlet 311, 314 of an exemplary embodiment of the atomization device 300 may be tangential or at least non perpendicular to the atomization head 310 to provide a swirl movement of the atomization gas stream 240, in the atomization head 222 and a dynamic rotational movement of the atomization plume in the atomization chamber 108.

In at least one embodiment, at least one non perpendicular gas inlets (e.g. 311, 314) with respect to the atomization manifold 310 may create a swirl movement of the atomization gas stream 240 in the atomization head 222 leading to a dynamic rotational movement of the atomization plume in the atomization chamber 108.

In at least one embodiment, at least two gas inlets 314 may be non perpendicular to the atomization head 222 creating a swirling effect in the atomization head 222 and a dynamic rotational effect in the atomization area 230 and the atomization chamber 108.

In at least one embodiment, the at least one water inlet (e.g. 122 or 120 in FIG. 1) may be located inside the atomization chamber 108.

In at least one embodiment, the at least one water inlet (e.g. 122 or 120 in FIG. 1) may be suitable for providing water for cooling said powder.

For example, the at least one water inlet (e.g. 122 or 120 in FIG. 1) may be suitable for providing water for transporting said powder to the sieving/drying area.

In at least one embodiment, the at least one water inlet can be suitable for providing water for facilitating sorting/sieving of the powder.

EXAMPLES

Example 1

Sn-3% Ag-0.5% Cu (SAC305)

In this exemplary test, the atomization of Sn-3% Ag-0.5% Cu (SAC305) was carried out in a large atomizer with a batch size of 20 kg using the atomization manufacturing process and the atomization device as described herein.

Table 1A shows the atomization conditions of the test of Example 1.

TABLE 1A

Atomization conditions applied in the test of Example 1.

| Gas feed rate, g/sec | Gas velocity, | Metal feed rate, kg/min | Gas to metal volume ratio |
|---|---|---|---|
| 132 | 560 m/s | 4 | 11 700 |

The resulting particle size distribution is shown in Table 1B. It is noted that the level of particles between 1 to 25 μm is quite high (80%).

TABLE 1B

Resulting particle distribution.

| D50, μm [1] | Sigma [1] | <25 μm [2] yield | >25 μm [2] yield |
|---|---|---|---|
| 11.9 | 1.8 | 80 | 20 |

([1] As-atomized powder; [2] Yield measured after classification.)

Figure 4A:
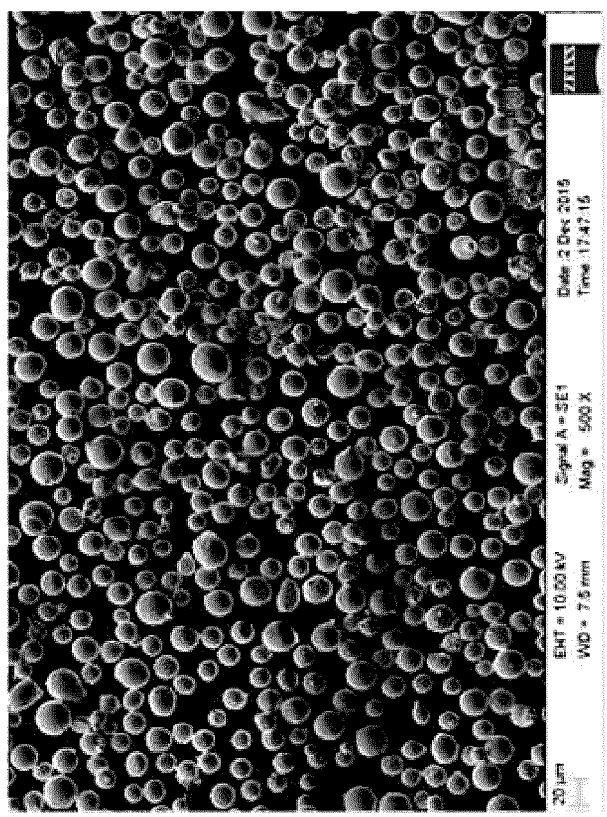
FIGS. 4A and 4B illustrate scanning electron microscope (SEM) pictures of the powder obtained in Example 1, wherein FIG. 4A refers to a Type 5 powder (15-25 μm) and FIG. 4B refers to a Type 7 powder (1-11 μm)
Figure 4B:
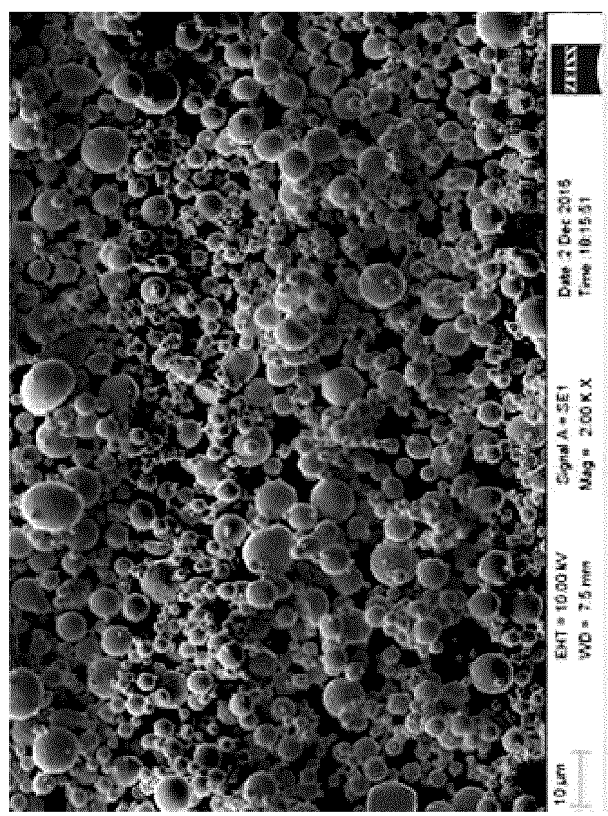

FIGS. 4A and 4B show SEM pictures of the powder obtained in the Example 1.

Morphology as determined with a Malvern Morphology equipment was measured. The circularity of the powder particles was about 0.983 (the circularity is 1 for perfect spheres).

Example 2

Sn-58% Bi (SnBi)

In the test of the Example 2 the atomization of Sn-58% Bi (SnBi) was carried out in a larger scale-atomizer with a batch size of ~20 Kg using the atomization manufacturing process and the atomization device as described herein.

TABLE 2A

Atomization conditions applied in the test of Example 2.

| Gas feed rate, g/sec | Gas velocity, m/sec | Metal feed rate, Kg/min | Gas to metal volume ratio |
|---|---|---|---|
| 132 | 560 | 4.5 | 12 100 |

TABLE 2B

Observed particle size distribution.

| D50, μm | Sigma | <25 μm yield, % | >25 μm yield, % |
|---|---|---|---|
| 12 | 1.8 | 90 | 10 |

Table 2B shows observed particle size distribution. It should be noted that the level of particles between 1 to 25 μm is quite high (90%).

Figure 5A:
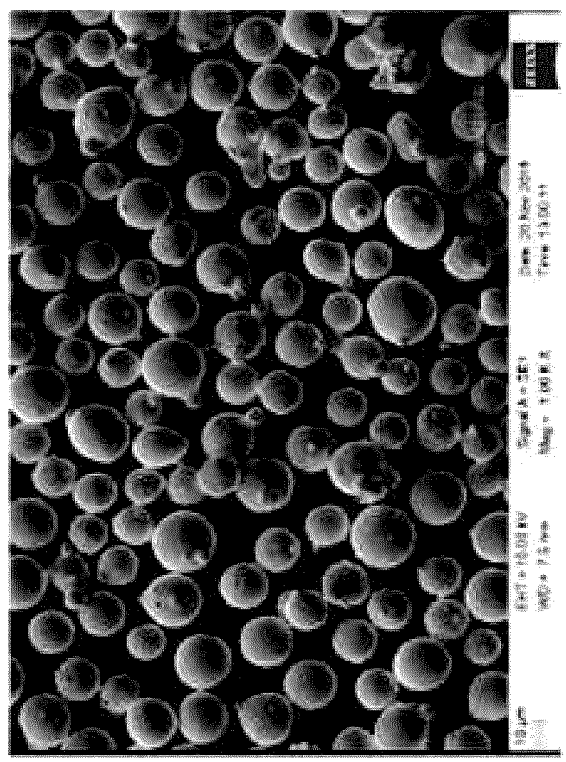
FIGS. 5A and 5B illustrates SEM pictures of the powder obtained in Example 3, wherein FIG. 5A refers to a Type 5 powder (15-25 μm) and FIG. 5B refers to a Type 6 powder (5-15 μm)
Figure 5B:
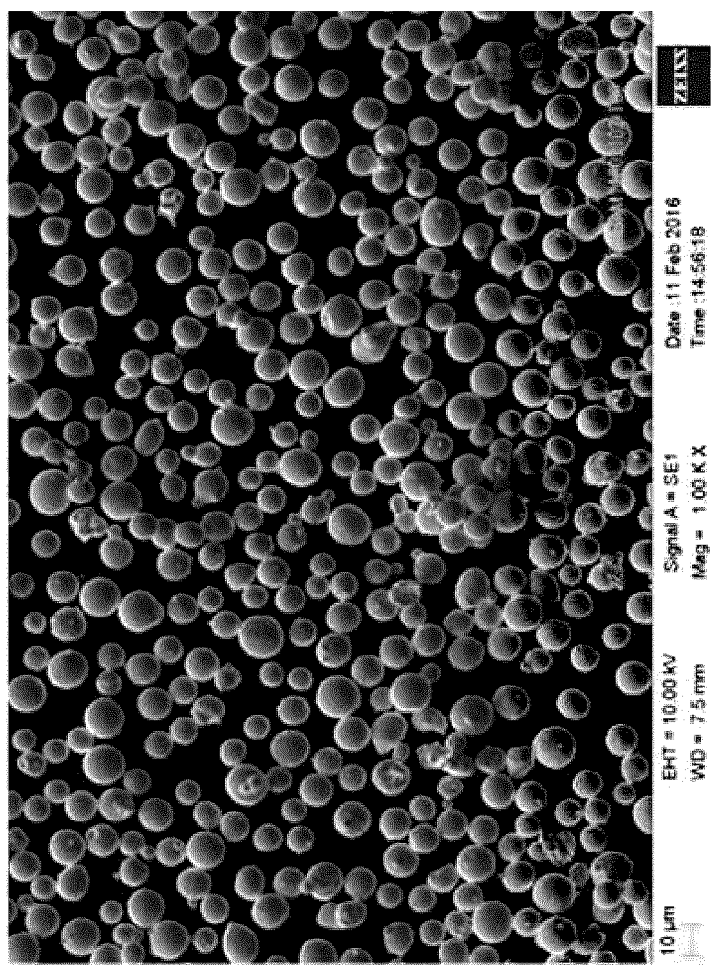

FIGS. 5A and 5B show SEM pictures of the powder obtained in the Example 2.

Morphology as determined with a Malvern Morphology equipment was also measured. The circularity of the powder particles was about 0.98.

Example 3

InSn (Sn-50% In)

In the test of the Example 3, the atomization of InSn (Sn-50% In) was carried out in a larger scale-atomizer with a batch size of ~24 Kg using the atomization manufacturing process and the atomization device as described herein.

TABLE 3A

Atomization conditions applied in the test of Example 3.

| Gas feed rate, g/sec | Gas velocity, m/sec | Metal feed rate, kg/min | Gas to metal volume ratio |
|---|---|---|---|
| 100 | 535 m/s | 4.0 | 8 800 |

Figure 6:
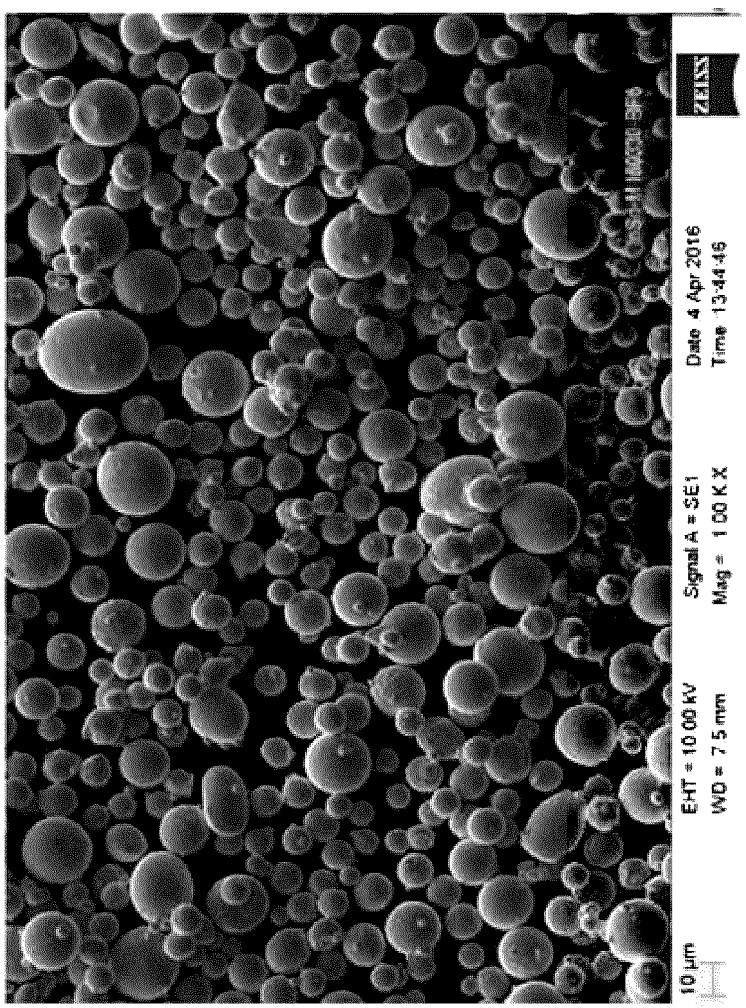
FIG. 6 illustrates SEM picture of the powder (7-25 μm) obtained in Example 4.

FIG. 6 shows SEM picture of the powder obtained in the Example 3.

Morphology as determined with a Malvern Morphology equipment was also measured. The circularity of the powder particles was about 0.936.

Example 4

Pure Bi

In the test of the Example 4, the atomization of Bi was carried out in a larger scale-atomizer with a batch size of ~16 Kg using the atomization manufacturing process and the atomization device as described herein.

TABLE 4A

Atomization conditions applied in the test of Example 4.

| Gas feed rate, g/sec | Estimated average gas velocity, m/sec | Metal feed rate, kg/min | Gas to metal volume ratio |
|---|---|---|---|
| 85 | 525 | 2.6 | 15 400 |

TABLE 4B

Observed particle size distribution.

| D50, μm | Sigma | <25 μm yield, % | >25 μm yield, % |
|---|---|---|---|
| 12.5 | 1.9 | 86 | 14 |

Table 5B shows observed particle size distribution. It should be noted that 86% of the powder was under 25 microns.

Figure 7A:
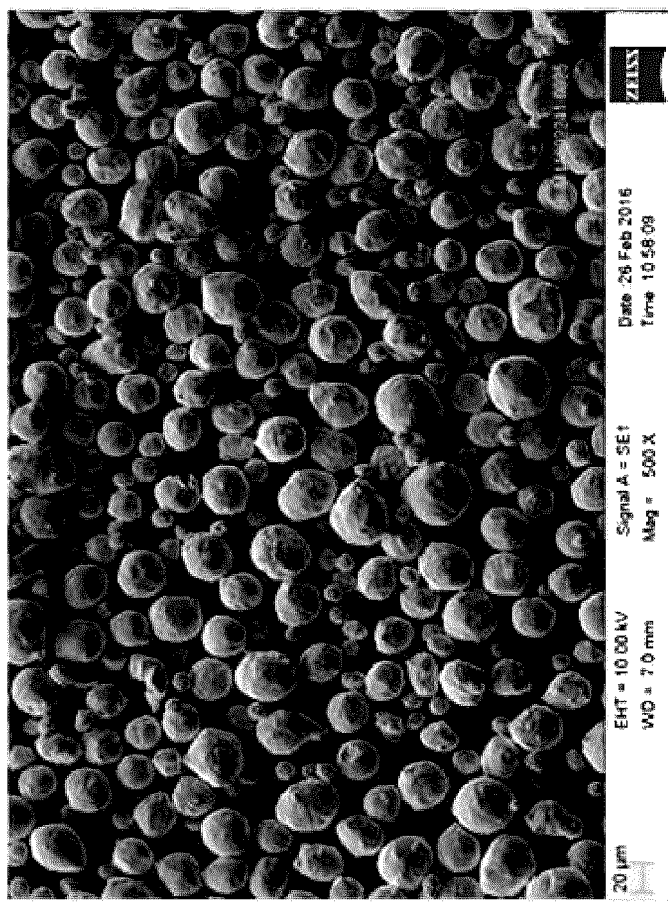
FIGS. 7A and 7B illustrate SEM pictures of the powder obtained in Example 5, wherein FIG. 7A refers to a +25 μm powder and FIG. 7B refers to a −25 μm/+10 μm powder.
Figure 7B:
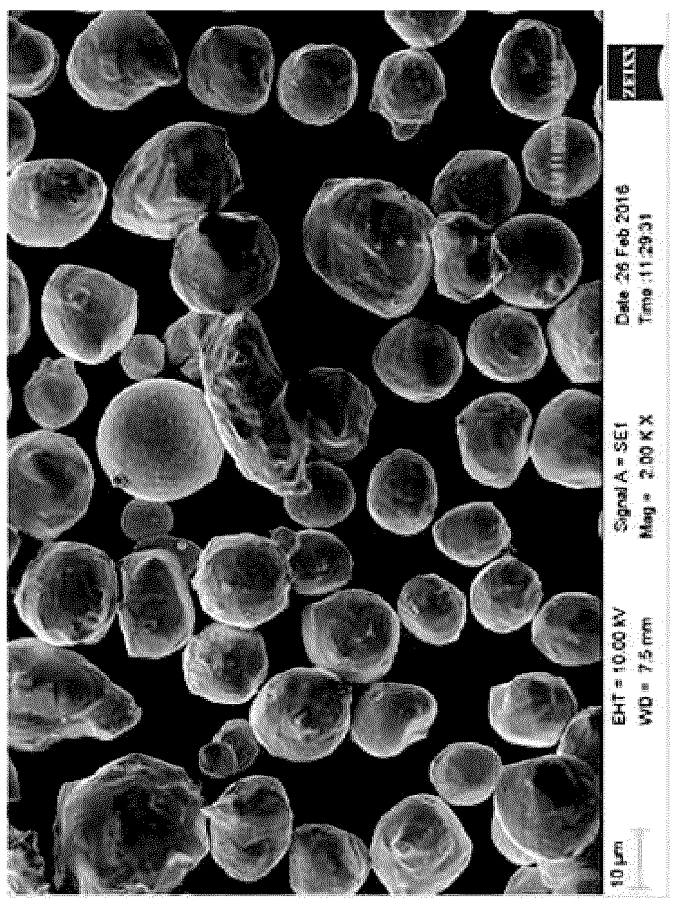

FIGS. 7A and 7B show SEM pictures of the powder obtained in the Example 4.

The invention claimed is:

1. An atomization process for manufacturing a metal powder, a selenium powder, a tellurium powder or an alloy powder having a melting point of about 50 to about 500° Celsius comprising:
providing a melt of a metal, selenium, tellurium or an alloy having said melting point of about 50° Celsius to about 500° Celsius through a feed tube;
delivering said melt through a diverter to an atomization area;
providing at least one atomization gas stream to the atomization area;
delivering water to an atomization chamber used for said atomization process, wherein, prior to being delivered to the atomization area, the melt is diverted in the diverter at a diverting angle with respect to a central axis of the feed tube.

2. The process of claim 1, wherein the diverting angle is about 30 to about 70 degrees.

3. The process of claim 1, wherein the diverting angle is about 10 to about 90 degrees.

4. The process of claim 1, wherein an angle formed between the atomization gas and the melt is about 40 to about 90 degrees.

5. The process of claim 4, wherein the ratio of the atomization gas to the metal in the atomization area is about 10 000 to about 20 000 cm$^3$ of gas per cm$^3$ of metal to be atomized.

6. The process of claim 4, wherein the ratio of the atomization gas to the metal in the atomization area is about 5 000 to about 30 000 cm$^3$ of gas per cm$^3$ of metal to be atomized.

7. The process of claim 1, wherein the process comprises providing a metal having said melting point of about 50° Celsius to about 500° Celsius.

8. The process of claim 7, wherein the metal has a melting point of about 150° Celsius to about 500° Celsius.

9. The process of claim 1, wherein the metal is an element selected from the group consisting of Zn, In, Sn, Pb, and Bi.

10. The process of claim 1, wherein the process comprises providing an alloy having said melting point of about 50° Celsius to about 500° Celsius.

11. The process of claim 10, wherein the alloy has a liquidus temperature of about 100° Celsius to about 300° Celsius.

12. The process of claim 10, wherein the alloy comprises at least one element selected from the group consisting of Cu, Sb, Zn, In, Mg, Sn, Pb, Ag, Se, Te, Ga, and Bi.

13. The process of claim 1, wherein the atomization gas stream has a velocity of about 300 m/s to about 700 m/s.

14. The process of claim 1, wherein the atomization gas stream has a supersonic speed.

15. The process of claim 1, wherein the atomization gas is delivered to an atomization head through at least one gas inlet oriented in a non-perpendicular way with respect to the atomization head, the gas inlet providing a swirl movement in the atomization head prior to the gas exit.

16. The process of claim 15, wherein the at least one gas inlet creates a circular flow in the atomization head leading to a dynamic rotational movement of the gas in the atomization area and the atomization chamber.

17. The process of claim 1, thereby providing a distribution of powder particle sizes with geometric standard deviation of about 1.5 to about 1.8.

18. The process of claim 1, wherein the atomization chamber comprises about 0 to about 20% of oxygen.

19. The process of claim 1, wherein the alloy melt is diverted through at least two melt diverting channels and the diverting angle is formed between the central axis of the feed tube and one of the at least two melt diverting channels.

20. The process of claim 1, wherein at least one jet of water is sprayed into the atomization chamber.

21. The process of claim 1, thereby providing a powder in which at least about 80% of the powder has an average particle size of less than about 25 μm.

22. The process of claim 1, thereby providing a powder in which at least about 75% of the powder has an average particle size of about 1 μm to about 15 μm.

* * * * *